United States Patent
Raval et al.

(10) Patent No.: US 6,990,342 B2
(45) Date of Patent: Jan. 24, 2006

(54) METHOD AND APPARATUS FOR CELL RESELECTION WITHIN A COMMUNICATIONS SYSTEM

(75) Inventors: Tushar Raval, Arlington Heights, IL (US); Kris A. Seeley, Chicago, IL (US); Damodaran Vasudevan, Palatine, IL (US)

(73) Assignee: Motorola, Inx., Schaumburg, IL (US)

( * ) Notice: Subject to any disclaimer, the term of this patent is extended or adjusted under 35 U.S.C. 154(b) by 149 days.

(21) Appl. No.: 10/230,516

(22) Filed: Aug. 29, 2002

(65) Prior Publication Data

US 2005/0059399 A1    Mar. 17, 2005

(51) Int. Cl.
     *H04Q 7/20*      (2006.01)

(52) U.S. Cl. .................................................... 455/436

(58) Field of Classification Search ................ 455/436, 455/437, 438–440, 442, 443–446, 450, 451, 455/452–455, 456.1, 2, 421, 428, 429, 432.1, 455/434, 435.1, 435.2
See application file for complete search history.

(56) References Cited

U.S. PATENT DOCUMENTS

| | | | | |
|---|---|---|---|---|
| 5,129,072 A | * | 7/1992 | Larner et al. ................. | 710/48 |
| 5,740,535 A | * | 4/1998 | Rune ........................... | 455/437 |
| 5,930,710 A | * | 7/1999 | Sawyer et al. ............... | 455/436 |
| 6,081,713 A | * | 6/2000 | Desgagne .................... | 455/436 |
| 6,259,915 B1 | * | 7/2001 | Raith .......................... | 455/434 |
| 6,446,150 B1 | * | 9/2002 | Morger et al. ............... | 710/116 |
| 6,463,055 B1 | * | 10/2002 | Lupien et al. ............... | 370/353 |
| 6,466,790 B2 | * | 10/2002 | Haumont et al. ........... | 455/437 |
| 6,532,363 B1 | * | 3/2003 | Pussinen .................. | 455/435.1 |
| 6,567,665 B1 | * | 5/2003 | Kissee ........................ | 455/436 |
| 2001/0031638 A1 | * | 10/2001 | Korpela et al. ............. | 455/449 |
| 2002/0032032 A1 | * | 3/2002 | Haumont et al. ........... | 455/436 |
| 2002/0137522 A1 | * | 9/2002 | Landais et al. ............. | 455/455 |

FOREIGN PATENT DOCUMENTS

| | | |
|---|---|---|
| EP | 1 059 820 A2 | 12/2000 |
| EP | 1 059 820 A3 | 2/2001 |

* cited by examiner

*Primary Examiner*—William D. Cumming

(57) ABSTRACT

Transferring communication within a communication system occurs as follows: during communication with a serving base station, in order to shorten the duration before downlink data can be initiated to a remote unit that has performed cell reselection, an automatic downlink procedure is executed. The auto downlink procedure transfers remote unit related information to a scheduler for appropriate allocation of air interface resources for a remote unit that recently has undergone a cell reselection procedure. When the remote unit reestablishes itself in a target cell, the source packet control unit determines that the cell reselection was successful and selectively transfers radio access capability information to the target packet control unit. The target packet control unit immediately is able to transfer downlink data arriving from the serving GPRS support node to the remote unit without first establishing a downlink temporary block flow, thereby significantly reducing the time required for cell reselection.

13 Claims, 5 Drawing Sheets

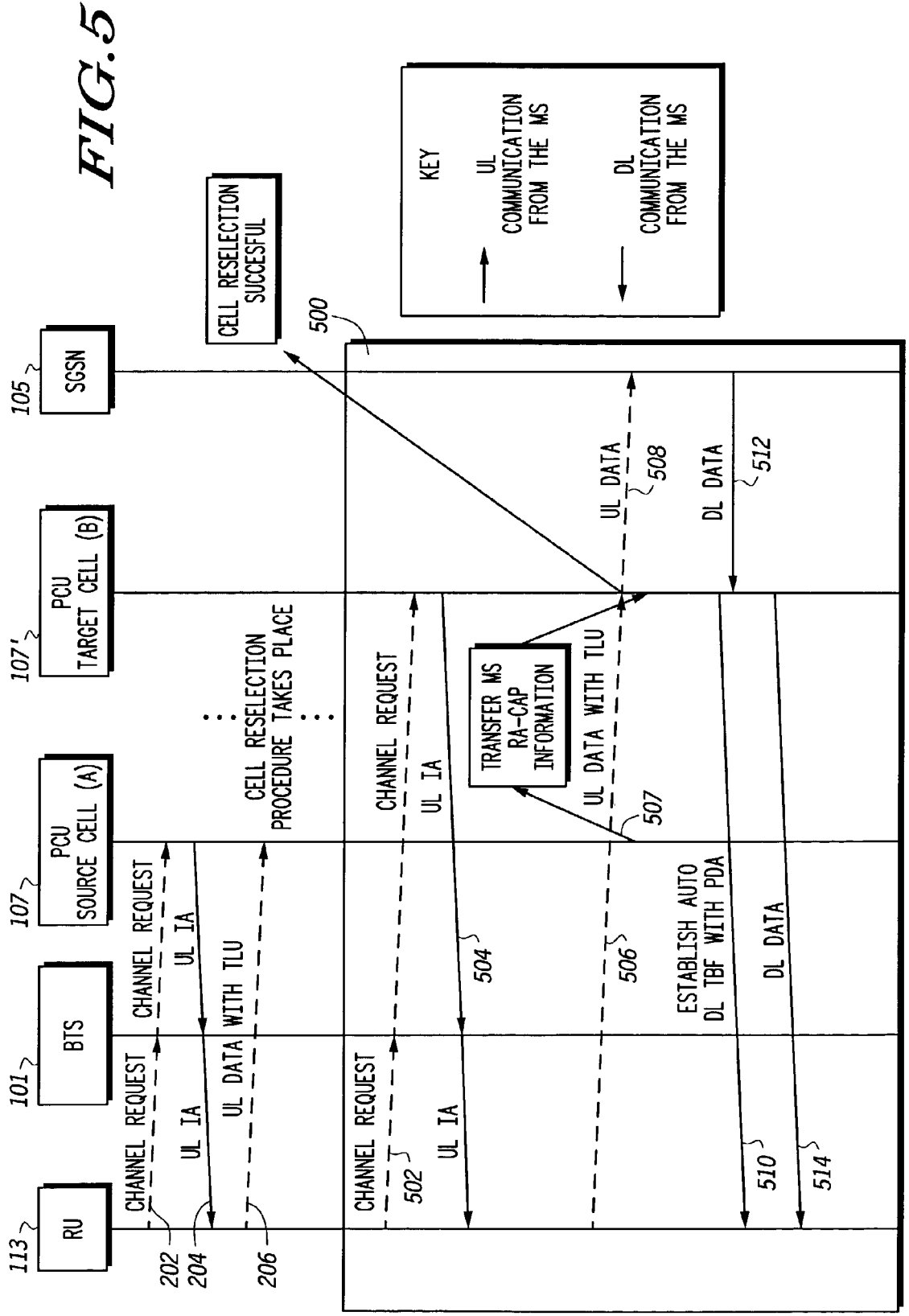

METHOD AND APPARATUS FOR CELL RESELECTION WITHIN A COMMUNICATIONS SYSTEM

FIELD OF THE INVENTION

The present invention relates generally to cellular communication systems and, more particularly, to transferring a remote unit's communication among cells within such cellular communication system.

BACKGROUND OF THE INVENTION

Communication systems are well known and comprise many types including land mobile radio, cellular radiotelephone, personal communication systems, and other communication systems. Within a communication system, transmissions are conducted between a transmitting device and a receiving device over a communication resource, commonly referred to as a communication channel. To date, the transmissions have typically consisted of voice signals. More recently, however, there has been rapidly growing interest in carrying other forms of signals, including high-speed packetized data signals, suitable for video, audio and other high bandwidth data applications. For ease of operation and to facilitate cost effective upgrading of existing voice systems to allow for data services, it is preferable to have the data transmission capability overlay the existing voice communication capability, such that its operation is essentially transparent to the voice communication system while still utilizing the communication resources and other infrastructure of the voice communication system.

One such communication system currently available with transparent data transmission capabilities is a General Packet Radio Service (GPRS) system, as described in the Global System for Mobile Communications (GSM) Technical Specification (TS) 08.18 and incorporated by reference herein. Within such a communication system, a GSM communication system is overlaid with a GPRS communication system. In contrast to GSM's service model, which offers telephony on demand, GPRS's service model offers a wireless Wide Area Network (WAN) supporting a wide range of applications such as low-volume intermittent telemetry, video, web browsing, and the transfer of large amounts of data.

In such a system, as the location of the remote unit (RU), RF conditions or congestion level deteriorate, and because the RU does not have knowledge of the congestion level of the source or neighbor cell, the remote unit (RU) may experience better radio conditions or congestion level from a neighboring cell. At that point, the GPRS network or the RU may perform a cell reselection. In GPRS networks, cell reselection may occur as often as every fifteen seconds. During cell reselection, the RU terminates the temporary block flow (TBF) from its current source cell and reestablishes the connection after a period of approximately two to three seconds at the neighboring target cell. During this period, the RU is unable to receive any downlink data and does not maintain any contact with the core network.

More particularly, during an auto downlink procedure, the network starts a new downlink TBF for the RU after the RU has requested an uplink TBF, and also currently does not have a downlink TBF active. Dummy downlink data is transmitted to the RU in this auto downlink TBF until either real downlink data is ready to transmit to the RU, or a timer expires. The network starts the auto downlink TBF once it knows the RU's RA-CAP information after the uplink TBF is established.

By way of example, in the case of a two-phase packet access, the network knows the RA-CAP information when it receives the Packet Resource Request (PRR) message from the RU. The RA-CAP information is embedded in the PRR message. In the case of a one-phase packet access, the network first must obtain the RU's identity. The identity of the RU is transmitted to the network in the first uplink data block. The first uplink data block contains the RU's Temporary Logical Link Identity Identity (TLLI). Once the network has the RU's TLLI, the network can retrieve the RU's RA-CAP information by executing an RA-CAP-UPDATE procedure. The RA-CAP-UPDATE procedure is used by the PCU to request an RU's radio access capabilities from the SGSN, as defined in GSM TS 08.18. The SGSN may or may not support this procedure. Hence, because of the messaging required between the network and the PCUs and other network components, the downlink data from the network is significantly delayed from reaching the remote unit each time cell reselection occurs.

BRIEF DESCRIPTION OF THE DRAWINGS

FIG. 5 illustrates a method of operation of the communication system of FIG. 1 in accordance with an embodiment of the present invention.

DETAILED DESCRIPTION

In order to address the need for a faster cell reselection procedure and others, transferring communication within a communication system occurs as follows: during communication with a serving base station, in order to shorten the duration before downlink data can be initiated to a RU that has performed cell reselection, an automatic downlink procedure is executed. The auto downlink procedure is achieved by implementing a mechanism at the PCU that transfers RU related information to the scheduler for appropriate allocation of air interface resources for a RU that recently has undergone a cell reselection procedure. When the RU reestablishes itself in a target cell, the source PCU determines that the cell reselection was successful and selectively transfers radio access capability (RA-CAP) information to the scheduler to establish auto downlink TBF for the RU. At this time, the auto downlink TBF is started, thereby enabling data to be sent immediately.

A particular advantage of the auto downlink procedure is the significant reduction of control messages passing over the air interfaces. Further, dependency on the core network for obtaining capabilities of a mobile during cell reselection is reduced. Thus, interaction with the SGSN in the form of transmitting and receiving messages is eliminated, resulting in a reduction of signaling and the elimination of dependency on the SGSN during the cell reselection process.

The present invention includes a method for transferring communication within a communication system. The method identifies a target cell to which to transfer communication from the RU. A cell reselection request to the target cell is then initiated for requesting transfer of RU communication from the source cell to the target cell. The identity of the remote station is then transmitted to the target cell. After cell reselection is complete, the PCU transfers the RU's radio access capability information prior to downlink data arriving from the SGSN. Thus, dependency on the SGSN to obtain a RU's radio access capability information is reduced significantly.

The present invention further encompasses an apparatus for transferring communication within a communication system. The apparatus includes a PCU for controlling communicating between a base station and a RU. In a particular embodiment a target PCU is provided for controlling communicating between a target base station and a mobile station or RU and a source PCU is provided for controlling communicating between a source base station and an RU. The source PCU transfers RU operating information to the target PCU subsequent to cell reselection. An SGSN is provided for transferring downlink data to the target PCU for transferring the received downlink data to the RU.

Figure 1:
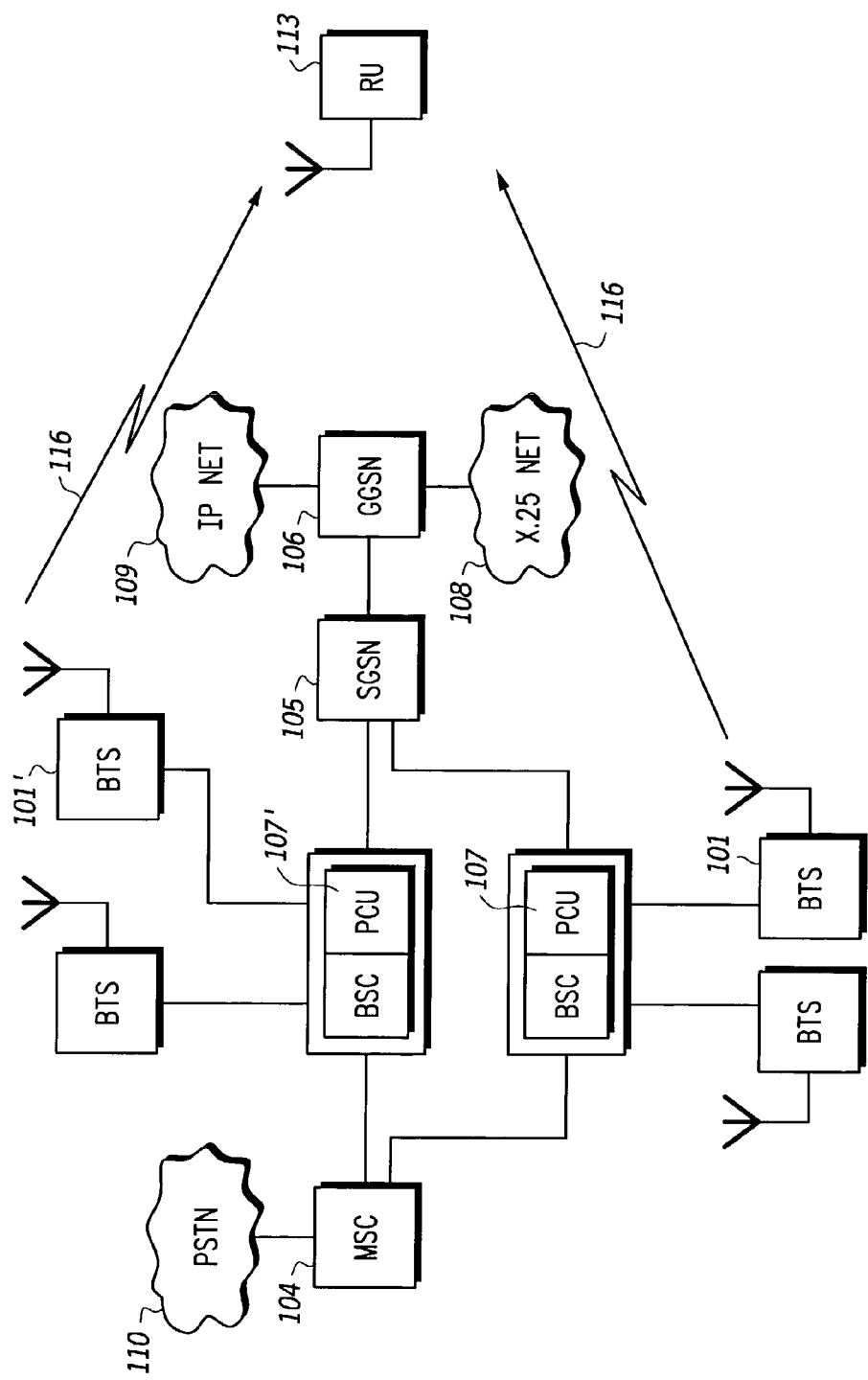
FIG. 1 is a block diagram of a communication system in accordance with an embodiment of the present invention.

Turning now to the drawings, FIG. 1 shows a block diagram of a communication system 100 in accordance with a first embodiment of the present invention. In the embodiment, communication system 100 comprises a GSM system overlaid with a GPRS system. In alternate embodiments, communication system 100 may utilize other analog or digital cellular communication system protocols such as, but not limited to, Narrowband Advanced Mobile Phone Service (NAMPS) protocol, Advanced Mobile Phone Service (AMPS) protocol, Code Division Multiple Access (CDMA) system protocol, Personal Digital Cellular (PDC) protocol, United States Digital Cellular (USDC) protocol, or Cellular Digital Packet Data (CDPD) protocol.

The GSM system comprises a number of network elements including serving Base Transceiver Station or base station (BTS) 101, neighboring base stations 102, 111, Base Station Controller (BSC) 103, and Mobile Switching Center (MSC) 104 for connecting the GSM system to the public switched telephone network (PSTN) 110. The GPRS system network elements include the serving BTS 101, the BSC 103 and an associated Packet Control Unit (PCU) 107, the neighboring BTS 101' and associated PCU 107', a Serving GPRS Support Node (SGSN) 105, and a Gateway GPRS Support Node (GGSN) 106. Additional network elements also are provided to more clearly indicate that the present system functions equally well with a single PCU or multiple PCUs. In the described embodiment of the present invention, all network elements are available from Motorola, Inc. of Schaumburg, Ill.

The SGSN 105 controls users' access to the GPRS network in terms of subscription checking and overall traffic load situations, while the GGSN 106 is the GPRS equivalent to a gateway function, which connects the GPRS network to external private or public networks 108–109. The PCU 107, which is connected to the BSC 103, provides a physical and logical data interface for packet data traffic inter-working between the packet radio interface on the BTS and the GPRS packet data core network. The RU maybe any type of remote device, such as a cellular telephone, handheld computing device, or any other communications device capable of sending and receiving data. It is contemplated that network elements within the communication system 100 are configured in well known manners with processors, memories, instruction sets, and the like, which function in any suitable manner to perform the function set forth herein.

During typical operation, the RU 113 moves throughout a coverage area of the serving BTS 101. The serving BTS 101 monitors a signal quality metric (e.g., RXLEV or received Bit Error Rate (BER)) of the RU's uplink communication signal. Additionally, the RU 113 monitors a signal quality metric of the neighboring base stations and reports the result to the serving base station. To account for changes in signal quality as the RU 113 moves throughout the communication system 100, the base station 101 will issue commands directing the RU 113 to handover to a base station that can better serve the RU 113 (e.g., neighboring base station 101').

The communication system comprises a set of neighboring base stations (e.g., base station 102) that are capable of supporting the service requirements of the RU 113. The RU 113 performs signal quality measurements of transmissions from all the base stations. When the serving base station 101 determines that a handover of RU 113 is needed, the base station 101 sends handover instructions to the RU 113 via the downlink communication signal 116, which instructs the RU 113 to handover to a neighboring base station that can best serve the RU 113.

When the RU 113 reestablishes itself in the target cell, it attempts to signal to the SGSN 105 its presence in the target cell by initiating an uplink TBF. To establish a new auto downlink TBF for the RU that has recently performed a cell change procedure and whose RA-CAP is unknown, the PCU in the base station sub system transmits a message querying the core network for the RU's RA-CAP. The cell reselection attempt is considered successful when the RU reestablishes itself in the target cell and transmits the first uplink data block containing its TLLI to the SGSN. At that point, one of three scenarios may occur in presently known networks. For purposes of discussion, referring to FIGS. 2–4, there are illustrated several known procedures for handling an RU that has performed cell reselection.

Figure 2:
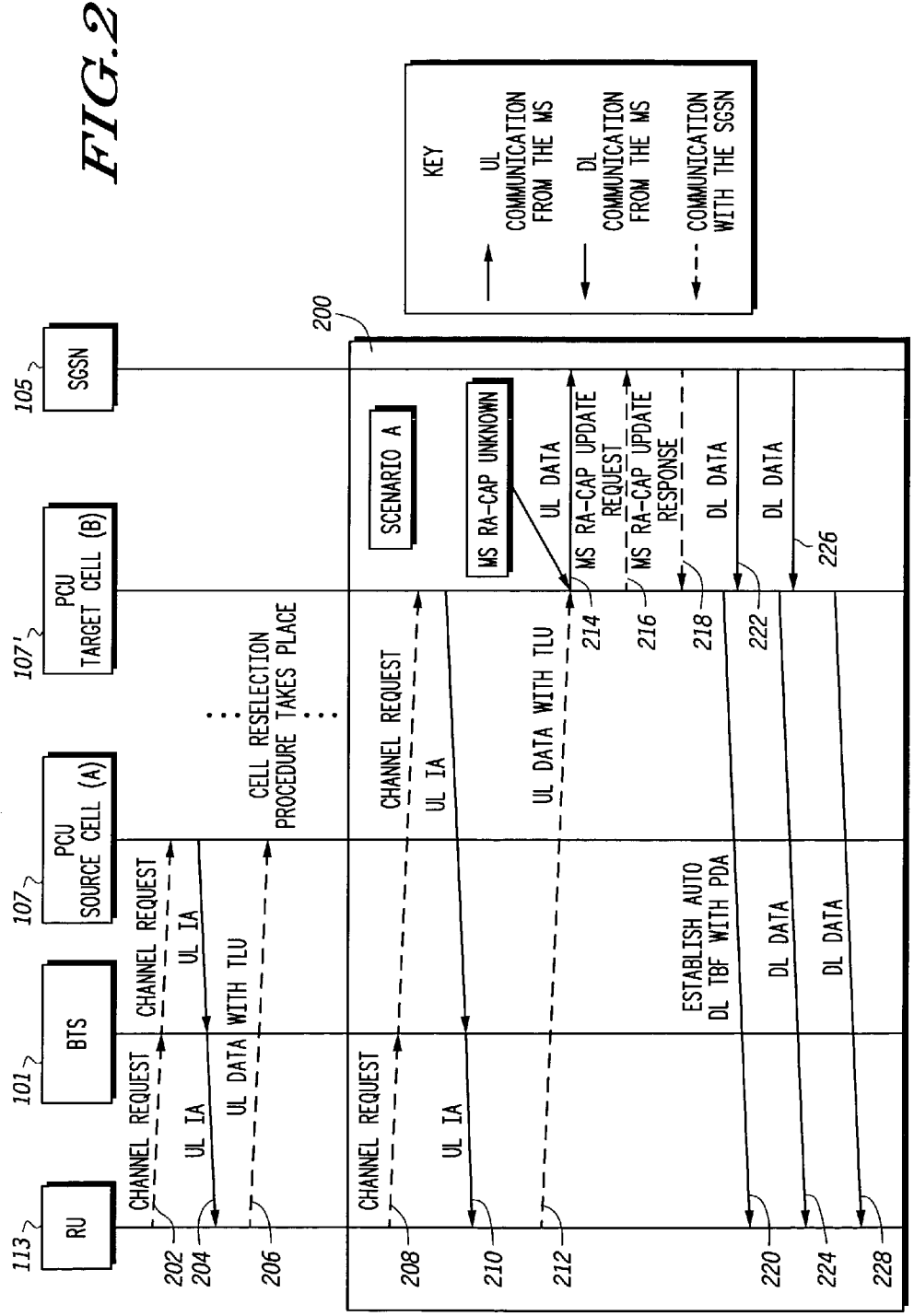
FIG. 2 illustrates a first prior method of operation of the communication system of FIG. 1.

Referring in particular to FIG. 2, there is shown a first method of cell reselection wherein the SGSN supports the RA-CAP-UPDATE procedure. In a normal mode of operation, the RU 113 establishes communication with the source PCU 107 by initiating a channel request 202 through the BTS 101. The source PCU 107, upon receiving the channel request, transmits an Uplink Immediate Assignment (ULIA) message 204 to the RU 113 through the BTS 101. The RU 113, upon receiving the ULIA, transmits an uplink data with TLLI message 206 to the PCU 107. Note, that this is a standard method of initiating contact between the RU and the network and is applicable to all prior art modes of operation and for the current system as well. Accordingly, the establishment of the initial connection is not further discussed.

Continuing to refer to FIG. 2, and as shown in block 200, the cell reselection procedure is illustrated in a known first scenario. The RU 113 transmits a channel request message 208 to the target PCU 107' through the BTS 101. The PCU 107 upon receiving the channel request message then transmits a ULIA data message 210 to the RU 113. In response, the RU 113 transmits a UL data with TLLI message 212 to the target PCU 107'. As a result, the UL data in step 214 is transferred from the PCU 107' to the SGSN 105 If the RU's 113 RA-CAP information is unknown in the target cell, the BSS (not shown) requests this information via the target PCU 107' from the SGSN 105 in step 216. If the SGSN 105 responds with the RU's RA-CAP information message 218 before the DL data is received from the SGSN 105, the BSS establishes an auto downlink TBF from the target PCU 107' to the RU 113 in step 220. When the messages 222, 226 carrying the DL data for the RU 113 arrives at the target PCU 107' from the SGSN 105, the DL TBF is already established. Thus, the data from the target PCU 107' immediately can be transmitted to the RU 113 in steps 224, 228. A particular drawback of the above described method is that the cell reselection procedure relies on the SGSN 105 supporting the RA-CAP-UPDATE procedure. In many cases, such support is not available. Even in such instances where the SGSN supports the RA-CAP-UPDATE procedure, a delay is encountered when contacting the SGSN 105.

Figure 3:
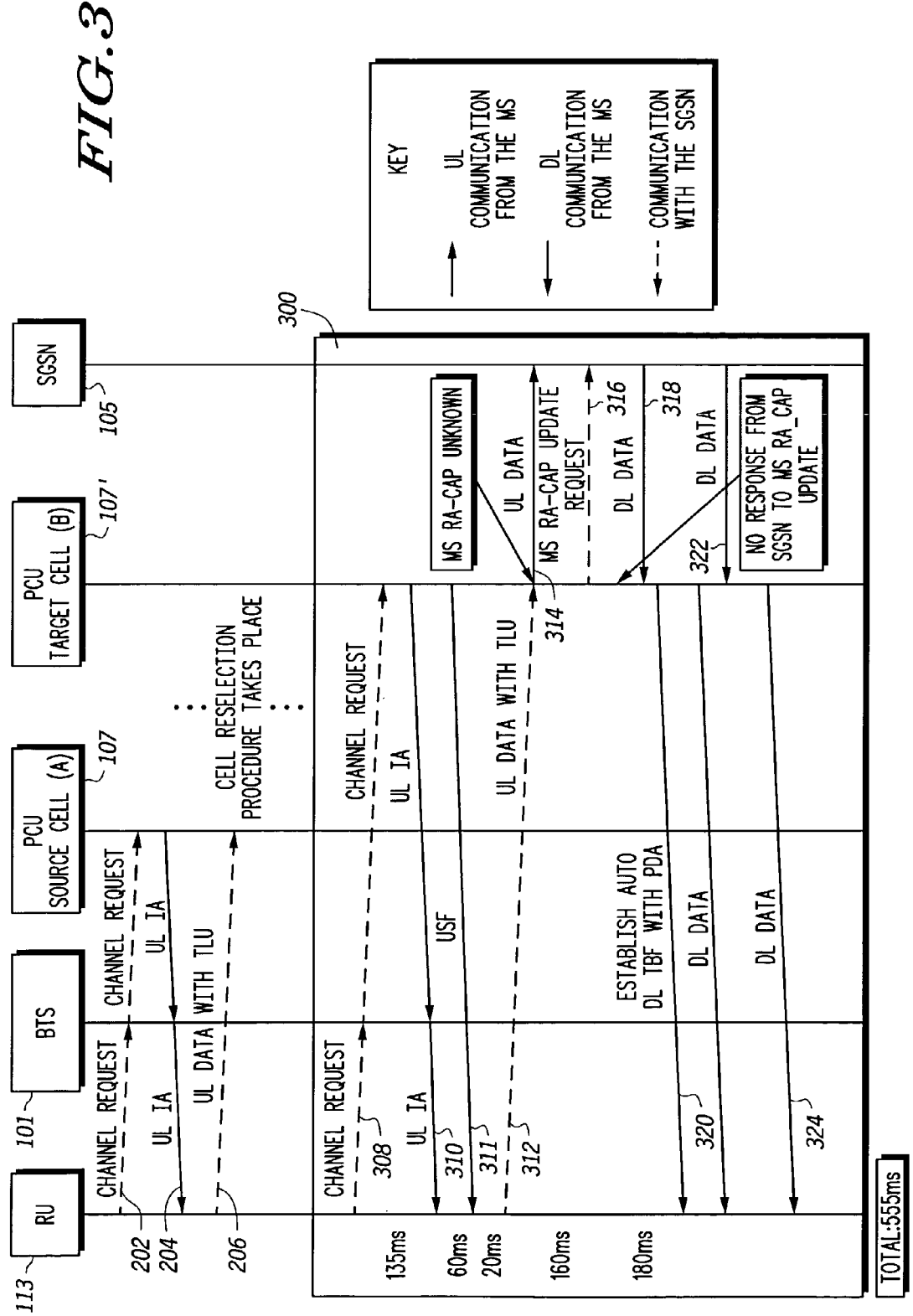
FIG. 3 illustrates a second prior art method of operation of the communication system of FIG. 1.

Referring to FIG. 3, there is illustrated a second known method of cell reselection where in the SGSN 105 does not support the RA-CAP-UPDATE procedure during cell reselection. Cell reselection is shown in a second scenario in box 300. The RU 113 transmits a channel request message 308 to the target PCU 107' via the BTS 101. In response, the target cell or PCU 107' transmits a ULIA message 310 to the RU 113 via the BTS 101. In addition, the target PCU 107' transmits an Uplink State Flag (USF) message 311. The RU 113 transmits UL data with TLLI message 312 to the target PCU 107' at which point the RU RA-CAP is unknown to the target PCU 107'. In step 314 the UL data is forwarded from the target PCU 107' to the SGSN 105. An RU RA-CAP-UPDATE request message 316 also is sent from the target PCU 107' to the SGSN 105. Because the SGSN 105 does not support the RA-CAP-UPDATE request feature, no response is provided from the SGSN 105 to the target PCU 107'. As such, the BSS is unable to start an auto downlink TBF with the RU when the core network SGSN 105 does not respond to the RA-CAP UPDATE request. If downlink data arrives in steps 318, 322 from the SGSN 105, a new downlink TBF is then started. Finally, DL data is transmitted from the target PCU 107' to the RU 113. A particular disadvantage of this method is that since the network must first start the downlink TBF, the transmission of the downlink data to the RU is delayed. It is estimated that the time it takes to start the autodownlink TBF may be on the order of around 555 milliseconds.

Figure 4:
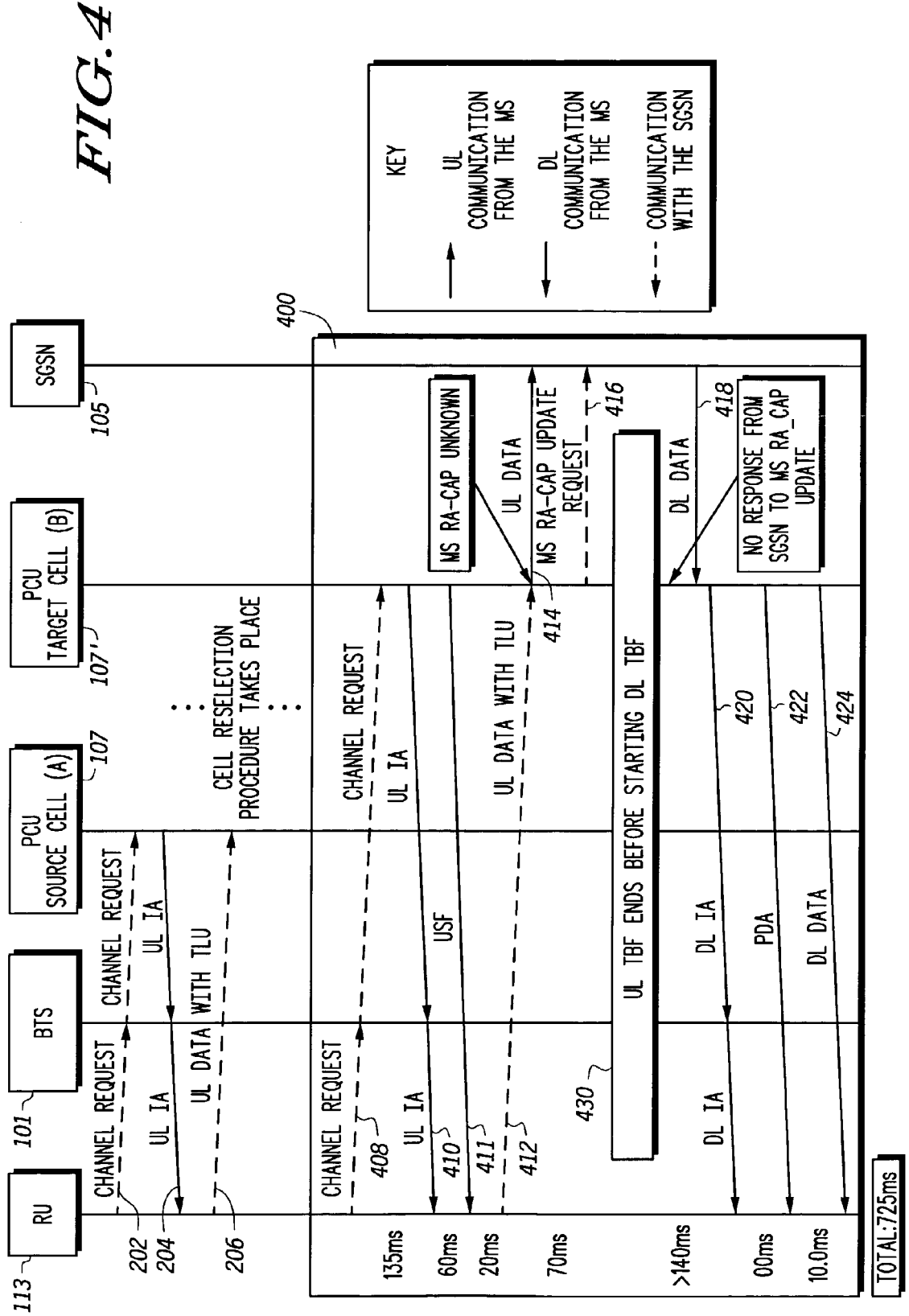
FIG. 4 illustrates a third prior art method of operation of the communication system of FIG. 1.

Referring to FIG. 4, there is illustrated another known cell reselection procedure wherein the UL TBF has ended before DL data for the mobile is received by the PCU 107' from the SGSN 105. As shown in block 400, the RU 113 transmits a channel request message 408 to the target PCU 107' via the BTS 101. The target PCU 107' sends a ULIA message 410 to the RU 113 via the BTS 101 and also sends a USF message 411 to the RU 113. Subsequently, the RU 113 transmits UL Data with TLI to the target PCU 107', which in step 414 sends UL data to the SGSN 105. If the RU's 113 RA-CAP information is unknown in the target cell or PCU 107', the BSS requests this information from the SGSN 105 in step 416.

Before the target PCU 107' receives an MS RA-CAP-UPDATE response and/or DL data, the UL TBF is ended in step 430. As such, the RU 113 is no longer on the packet data channel (PDCH), but back on a common control channel (CCCH) or a packet common control channel (PCCCH). Also, because the SGSN 105 does not support the MS RA-CAP-UPDATE message, the SGSN 105 never responds to the request from the target PCU 107'. It is in step 418, after an inordinately long delay, that the SGSN 105 finally sends DL Data to the target PCU 107'. The target PCU 107' then sends a DLIA message 420 to the RU 113 via the BTS 101. A Packet Downlink Assignment (PDA) message 422 is sent to the RU 113 from the SGN 105 and in step 424 DL Data also is sent from the SGSN 105 to the RU 113.

A particular disadvantage in the above-described scenario is that by ending the UL TBF before starting the DL TBF, the network virtually treats the cell reselection as a new mobile. This results in extra signaling on the air interface and accordingly results in a delay of the RU's downlink data. It is estimated that the time it takes to start the autodownlink TBF in this case may be on the order of around 725 ms. The end result is a data throughput decrease for the end user.

Turning now to FIG. 5, in a particular embodiment of the present invention, there is shown an auto downlink procedure for shortening the duration before downlink data is initiated to an RU 113 that has completed cell reselection. As shown in block 500, the RU 113 attempts cell reselection and requests a new channel by sending a channel request message 502 to the target PCU 107'. In response, the target PCU 107' sends a ULIA message 504 to the RU 113 via the BTS 101. Thereafter, the RU 113 transmits a UL Data with TLLI message 506 to the SGSN 105 via the target PCU 107'. At this point, the RU 113 is recognized in the new cell and the target PCU 107' recognizes that cell reselection was a success.

Because the source PCU 107 already is aware of the MS RA-CAP information of the RU 113, the source PCU 107 transmits the MS RA-CAP information to the target PCU 107' directly. Accordingly, the target PCU 107' is able to transfer downlink data from the SGSN 105 to the RU 113 immediately. Advantageously, the requirement that the MS RA-CAP-UPDATE request message be sent to the SGSN 105 is eliminated. Thus, the delay associated with either waiting for a response from the SGSN 105 or waiting for a timeout when the SGSN 105 fails to respond to the request also is eliminated. Further, control messages over the air interfaces are greatly reduced. The described cell reselection process of the present invention is fully compliant with European Telecommunications Standards Institute (ETSI) standards.

While there has been illustrated and described a particular embodiment of the present invention, it will be appreciated that numerous changes and modifications will occur to those skilled in the art, and it is intended in the appended claims to cover all those changes and modifications which followed in the true spirit and scope of the present invention.

What is claimed is:

1. A method for transferring a data communication within a communications network, the method comprising the steps of:
   identifying a target cell to which to transfer a data communication from a remote unit, wherein the remote unit is in communication with a source cell;
   initiating a cell reselection request to the target cell for requesting transferring of remote unit communication from the source cell to the target cell;
   transmitting the identity of the remote station to the target cell; and
   transferring remote station capability information to the target cell subsequent to the cell reselection request being initiated and prior to a first uplink data block containing the remote unit's identification information.

2. The method of claim 1, wherein the transferring step is executed prior to the remote device receiving downlink data from the network.

3. The method of claim 1, wherein the transferring step is executed subsequent to an uplink immediate assignment message being transmitted by the target cell.

4. The method of claim 2, wherein the transferring step is executed prior to establishing a downlink temporary block flow for enabling immediate downlink data flow from the network.

5. The method of claim 1, wherein the transferring step is executed subsequent to completion of cell reselection.

6. The method of claim 1, wherein the transferring step is executed prior to completion of cell reselection.

7. The method of claim 6, wherein cell reselection is initiated by a communication network.

8. The method of claim 5, wherein cell reselection is initiated by the remote unit.

9. An apparatus for controlling cell reselection in a communication system, comprising:
- a target control unit associated with a target cell for controlling communicating between a target base station and a remote unit (RU);
- a source control unit associated with a source cell for controlling communicating between a source base station and an RU, wherein the RU abandons communication with the source cell and establishes communication with the target cell during cell reselection, the source control unit configured to transfer RU operating information to the target control unit subsequent to the cell reselection operation; and
- a serving general packet radio service support node (SGSN) for transferring downlink data to the target control unit for enabling the target control unit to transfer the received downlink data to the RU without prior establishment of a downlink temporary block flow.

10. The apparatus of claim 9, wherein the communication system is a General Packet Radio Service (GPRS) system overlaid with a Global System for Mobile Communications (GSM) system.

11. The apparatus of claim 9, wherein the source and target control units comprise packet control units for directing data traffic in the communication system.

12. A method for transferring communication within a communications system, the method comprising the steps of:
- initiating a cell reselection request to a source cell for requesting transferring of communication between remote unit (RU) and the source cell to the remote unit and a target cell;
- transmitting the identity of the RU to the target cell for completing the cell reselection operation; and
- transferring RU capability information to the target cell subsequent to the cell reselection request being initiated and prior to uplink data being transmitted to a serving general packet radio service support node (SGSN).

13. The method of claim 12, further comprising the step of transferring downlink data arriving from the SGSN without first establishing a downlink temporary block flow.

* * * * *